United States Patent
Lobban et al.

(10) Patent No.: US 12,056,690 B2
(45) Date of Patent: Aug. 6, 2024

(54) SYSTEMS AND METHODS FOR DISTRIBUTED-LEDGER BASED COLLATERAL MOVEMENT

(71) Applicant: JPMORGAN CHASE BANK, N.A., New York, NY (US)

(72) Inventors: Tyrone D Lobban, London (GB); Karthik Subramanian, New York, NY (US); George Kassis, London (GB); Scott Andrew Lucas, St Albans (GB); Christine Moy, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 54 days.

(21) Appl. No.: 17/185,149

(22) Filed: Feb. 25, 2021

(65) Prior Publication Data
US 2021/0272112 A1  Sep. 2, 2021

Related U.S. Application Data

(60) Provisional application No. 62/983,111, filed on Feb. 28, 2020.

(51) Int. Cl.
| | |
|---|---|
| *G06Q 20/38* | (2012.01) |
| *G06Q 20/40* | (2012.01) |
| *H04L 9/08* | (2006.01) |
| *H04L 9/32* | (2006.01) |
| *H04L 9/00* | (2022.01) |

(52) U.S. Cl.
CPC ..... *G06Q 20/38215* (2013.01); *G06Q 20/405* (2013.01); *H04L 9/0894* (2013.01); *H04L 9/3213* (2013.01); *H04L 9/50* (2022.05)

(58) Field of Classification Search
CPC .................. G06Q 20/00–425; H04L 9/00–50
See application file for complete search history.

(56) References Cited

U.S. PATENT DOCUMENTS

| | | | | |
|---|---|---|---|---|
| 11,522,700 B1 * | 12/2022 | Auerbach | ............. | H04L 9/3213 |
| 2020/0042989 A1 * | 2/2020 | Ramadoss | ............ | G06Q 50/167 |

OTHER PUBLICATIONS

Deutsche Bundesbank, "How Can Collateral Management Benefit from DLT?", Jan. 2020 (Year: 2020).*
Extended European Search Report, dated Sep. 1, 2021, from corresponding International Application No. 21159793.5.
Deutsche Borse AG et al: "How Can Collateral Management Benefit from DLT?", Jan. 1, 2020 (Jan. 1, 2020), pp. 1-20.

* cited by examiner

*Primary Examiner* — Ari Shahabi
(74) *Attorney, Agent, or Firm* — GREENBERG TRAURIG LLP

(57) ABSTRACT

Systems and methods for distributed ledger-based collateral movement are disclosed. According to an embodiment, a method for distributed ledger-based collateral movement may include: (1) receiving, at a first collateral custodian computer system for a collateral custodian and from a client of the first collateral custodian, a collateral asset for a target asset held by a client of a second collateral custodian; and (2) tokenizing the collateral asset and writing a collateral token to a distributed ledger platform. The second collateral custodian receives, from the distributed ledger platform, the collateral token and releases the target asset to the first collateral custodian in response to receiving the collateral token.

6 Claims, 4 Drawing Sheets

SYSTEMS AND METHODS FOR DISTRIBUTED-LEDGER BASED COLLATERAL MOVEMENT

RELATED APPLICATIONS

This application claims priority to, and the benefit of, U.S. Provisional Patent Application Ser. No. 62/983,111 filed Feb. 28, 2020, the disclosure of which is hereby incorporated, by reference, in its entirety.

BACKGROUND OF THE INVENTION

1. Field of the Invention

Embodiments are generally directed to systems and methods for distributed ledger-based collateral movement.

2. Description of the Related Art

In a conventional collateral movement system, a bond (such as Bond A) may be used as collateral for another bond (e.g., Bond B). In moving Bond A from a first collateral custodian to a second collateral custodian, friction exists whenever collateral/assets are moved between different types of accounts. Each leg can take up to a few hours resulting in an increase in auto borrow costs, cost of fails, misfunding, intraday liquidity needs, etc.

SUMMARY OF THE INVENTION

Systems and methods for distributed ledger-based collateral movement are disclosed. According to an embodiment, a method for distributed ledger-based collateral movement may include: (1) receiving, at a first collateral custodian computer system for a collateral custodian and from a client of the first collateral custodian, a collateral asset for a target asset held by a client of a second collateral custodian; and (2) tokenizing the collateral asset and writing a collateral token to a distributed ledger platform. The second collateral custodian receives, from the distributed ledger platform, the collateral token and releases the target asset to the first collateral custodian in response to receiving the collateral token.

In one embodiment, the method may further include retrieving, by the collateral custodian computer system, one or more collateral rules for the client of the second collateral custodian; and verifying, using the one or more collateral rules, that the collateral asset meets the collateral rules.

In one embodiment, the collateral rules may be written to the distributed ledger platform.

In one embodiment, the collateral asset and the target asset may be the same type of asset. In one embodiment, the collateral asset and/or the target asset may be bonds, cash, combinations thereof, etc.

In one embodiment, a first agent/intermediary may tokenize the collateral asset and may write the collateral token to the distributed ledger platform, and a second agent/intermediary may retrieve the collateral token from distributed ledger platform and may provide the collateral token to the second collateral custodian.

In one embodiment, the collateral asset may be escrowed after being tokenized.

In one embodiment, the target asset may be a physical asset.

According to another embodiment, a method for distributed ledger-based collateral movement may include: (1) receiving, at a first collateral custodian computer system for a collateral custodian and from a client of the first collateral custodian, a collateral asset for a target asset held by a client of a second collateral custodian; and (2) tokenizing the collateral asset and writing a collateral token to a distributed ledger platform. The second collateral custodian tokenizes the target asset writes a target asset token to the distributed ledger platform, receives, from the distributed ledger platform, the collateral token, and releases the target asset token to the first collateral custodian in response to receiving the collateral token.

In one embodiment, the method may further include retrieving, by the collateral custodian computer system, one or more collateral rules for the client of the second collateral custodian; and verifying, using the one or more collateral rules, that the collateral asset meets the collateral rules.

In one embodiment, the collateral rules may be written to the distributed ledger platform.

In one embodiment, the collateral asset and the target asset may be the same type of asset. In one embodiment, the collateral asset and/or the target asset may be bonds, cash, combinations thereof, etc.

In one embodiment, a first agent/intermediary may tokenize the collateral asset and may write the collateral token to the distributed ledger platform, and a second agent/intermediary may tokenize the target asset and may write the target asset token to the distributed ledger platform.

In one embodiment, the collateral asset and the target asset may be escrowed after being tokenized.

According to another embodiment, a method for verifying a collateral asset may include: (1) receiving, by a collateral custodian computer system and from a client, an identification of an asset to post as collateral for a target asset; (2) retrieving, by the collateral custodian computer system and for a counterparty with the target asset, one or more collateral rules; (3) verifying, by the collateral custodian computer system, that the collateral asset meets the one or more collateral rule; and (4) tokenizing, by the collateral custodian computer system, the collateral asset and writing a collateral token to a distributed ledger platform.

In one embodiment, the collateral rules may be written to the distributed ledger platform.

In one embodiment, the collateral rules may be updated in real-time.

In one embodiment, the step of verifying, by the collateral custodian computer system, that the collateral asset meets the one or more collateral rule may include posting an identification of the collateral asset on the distributed ledger platform. A smart contract may verify that the collateral asset meets the one or more collateral rules.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for distributed ledger-based collateral movement. Embodiments may use a distributed ledger (e.g., a Blockchain-based ledger) in a multiple participant platform.

Figure 1:
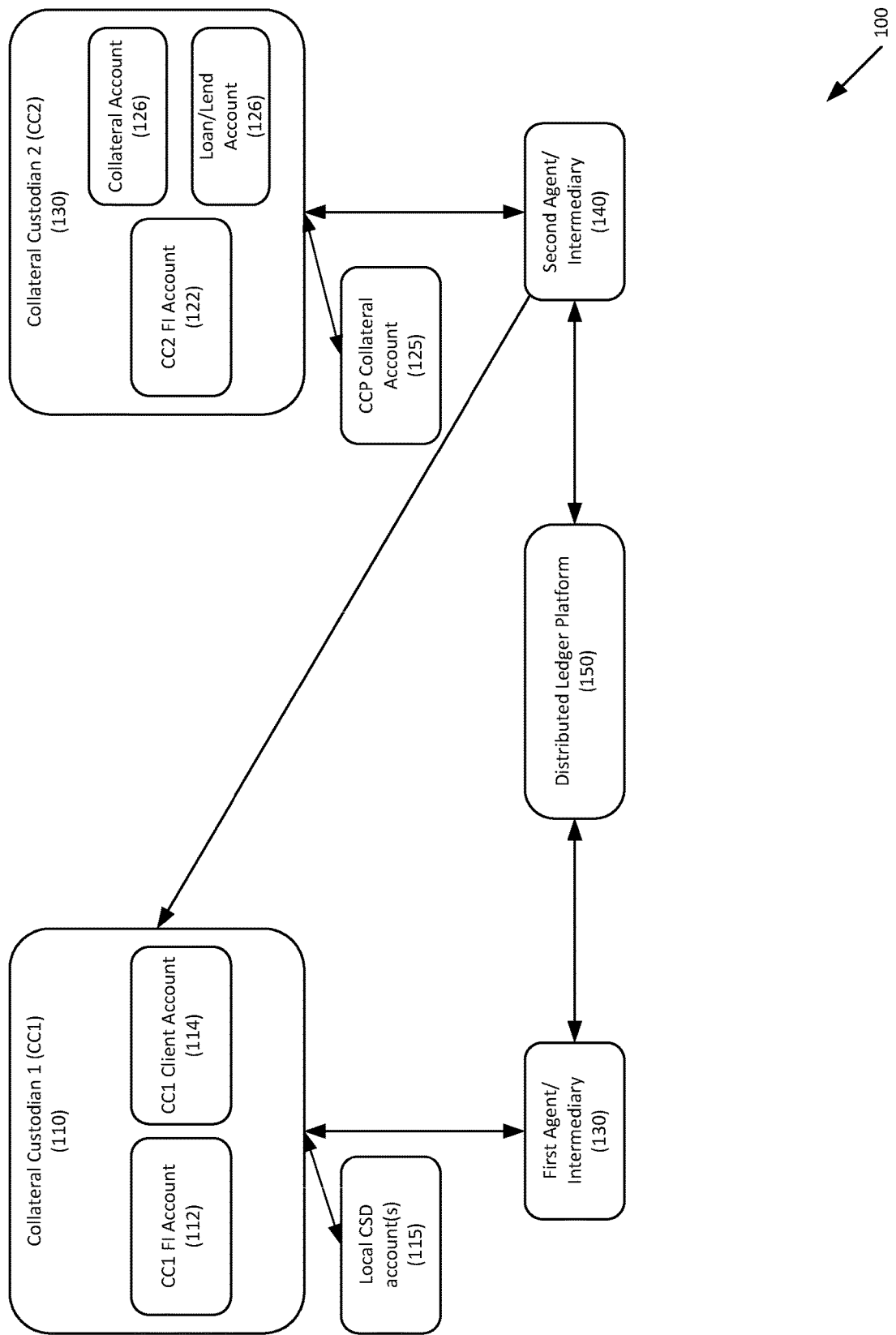
FIG. 1 is a depicts a system for distributed ledger-based collateral movement according to an embodiment.

Referring to FIG. 1, a system for distributed ledger-based collateral movement is disclosed according to embodiments. System 100 may include collateral custodian 1 (CC1) 110, which may be a collateral custodian for a financial institution. CC1 110 may maintain collateral custodian 1 financial institution (CC1 FI) account 112 and collateral custodian client account 114. Collateral custodian client account 114 may receive an asset to be used as collateral for a target asset held by collateral custodian 2 (CC2) 130.

Collateral custodian 2 (CC2) 130 may maintain collateral custodian 2 financial institution (CC2 FI) account 122, collateral account 126, and loan/lend account 126. In one embodiment, collateral account 126 may hold the target asset.

Loan/lend account 126 may be an intermediary between CC2 130 and collateral account 126.

First agent/intermediary 130 and second agent/intermediary 140 may be provided, and may interface between CC1 110 and distributed ledger platform 150, and CC2 130 and distributed ledger platform 150, respectively. In one embodiment, first agent/intermediary 130 and second agent/intermediary 140 may be optional. In another embodiment, first agent/intermediary 130 and second agent/intermediary 140 may be the same entity.

Although only two collateral custodians are, addition collateral custodians, additional agents/intermediaries, etc. may be provided. These entities may have the ability to exchange tokens (i.e., delivery versus delivery, or DvD) with atomic settlement in a substantially instantaneous way.

Embodiments may further assist with margin calls and exchange of margin. The regular process of collateral calls and returns (margin calls) will be quicker, thereby benefiting the client and the counterparty.

In embodiment, one or more local custodian (CSD) accounts 115 may be provided. CC1 110 may similarly interact with local CSD account(s) 115 with minimal, if any, friction. And one or more collateral counterparty (CCP) account 125 may be provided, and CC2 130 may also interact with CCP account(s) 125 with minimal, if any, friction.

In one embodiment, instead of being posted as collateral, the client may wish to substitute an asset for a target asset. For example, the client may post an asset (e.g., Bond A) and may receive a target asset (e.g., Bond B) once the tokenized asset is received.

In one embodiment, the asset and/or the target asset may further include cash, stable coins, etc.

Figure 2:
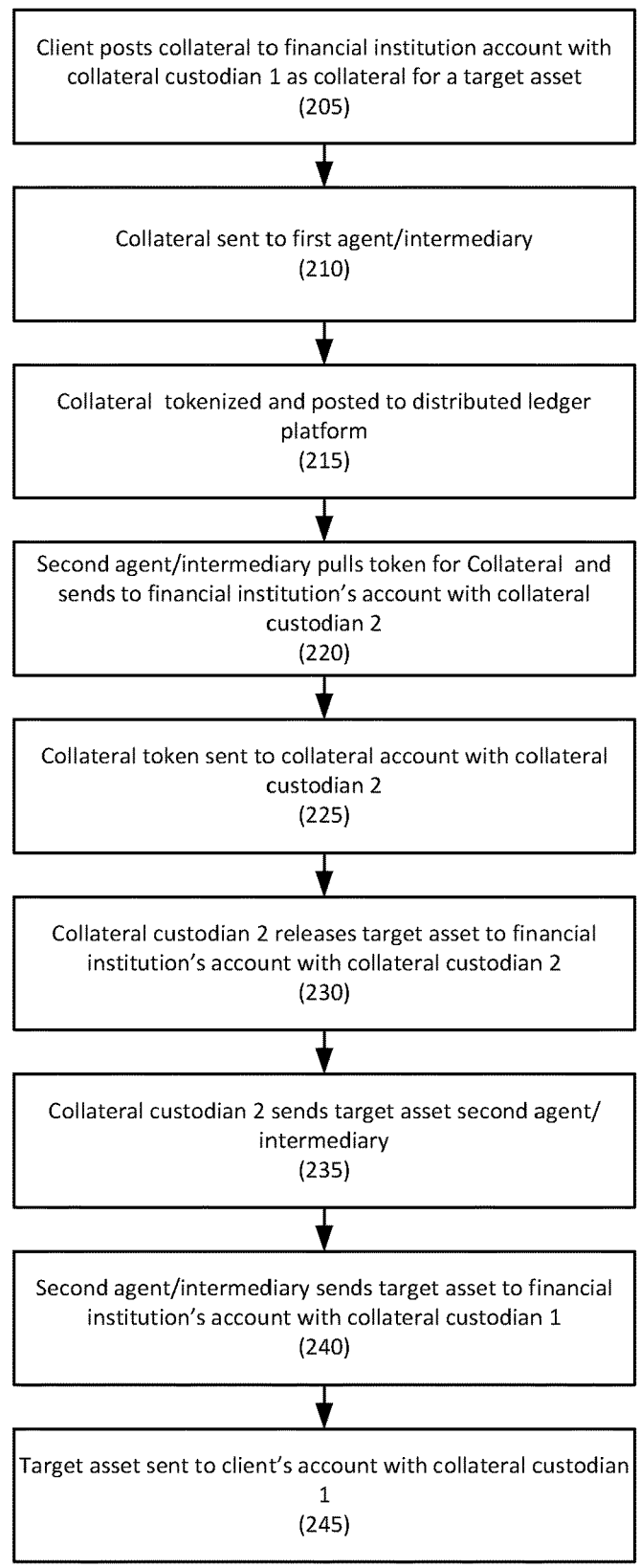
FIG. 2 depicts a method for distributed ledger-based collateral movement according to an embodiment.

Referring to FIG. 2, a method for distributed ledger-based collateral movement is disclosed according to an embodiment. Although this process may refer to the use of a bond as collateral and a bond as a target asset, it should be noted that other asset types, such as treasuries, securities, etc. may be used as is necessary and/or desired. Further, the type of asset used as collateral may be different from the type of target collateral.

In FIG. 2, collateral tokens for Bond A may be held with collateral custodian 1, while collateral custodian 1 needs the actual security (i.e., Bond B). This may be because, in the short-medium term, clients of collateral custodian 1 may want the physical asset or the token of the asset depending on the client's need and the purpose of transaction. This will be discussed with regard to FIG. 3.

While FIG. 2 depicts a sequential process, it should be noted that certain portions may occur simultaneously.

In step 205, a client of a financial institution may post collateral, such a Bond A, with collateral custodian 1 for collateral for a target asset, such a Bond B. For example, the client may want to acquire Bond B, so it posts collateral (Bond A) by sending it to the financial institution's account with collateral custodian 1 (CC1).

In one embodiment, the collateral may already in a customer account, may be in an account with CC1, etc.

In another embodiment, CC1 may be the entity wanting to post the collateral, and CC1 may post the collateral without a client.

In step 210, collateral custodian 1 may send the collateral to a first agent/intermediary. This may be optional, as an agent/intermediary may not be required.

In step 215, the first agent/intermediary may send the collateral to a distributed ledger technology (DLT) platform, such as a blockchain-based platform. The collateral may be tokenized by the distributed leger platform, if not already tokenized.

In one embodiment, the agent may perform the tokenization.

In one embodiment, once tokenized, the collateral may be put in escrow or otherwise ringfenced so it cannot be sold, traded, or otherwise disposed of. For example, the first agent/intermediary may keep the collateral, while sending instructions to the distributed ledger platform for tokenization.

In step 220, a second agent/intermediary may pull the token(s) for the collateral from the distributed leger platform. In one embodiment, the second agent/intermediary may be the same or a different agent or intermediary from the one that sent the collateral to the distributed leger platform. It should be noted that, like the first agent/intermediary, the second agent/intermediary may not be required.

In step 225, the agent or intermediary may send the collateral token(s) to the financial institution's account with collateral custodian 2 (CC2). The financial institution may then send the collateral token(s) to, for example, a loan/lending account. The loan/lending account may send the collateral token(s) to a collateral account.

In step 230, collateral custodian 2 may release the target asset.

In step 235, collateral custodian 2 may send the target asset to the financial institution's account with collateral custodian 2, and in step 240, the target asset may be sent to the client's account with collateral custodian 1. In one embodiment, the target asset may be sent from the financial institution's account with collateral custodian 2 to the second agent/intermediary, and the second agent/intermediary may send the target asset to the financial institution's account with collateral custodian 1. In step 245, the physical target asset may then be sent to the client, or it may remain with CC1.

This embodiment mitigates the frictions of the outbound leg.

Figure 3:
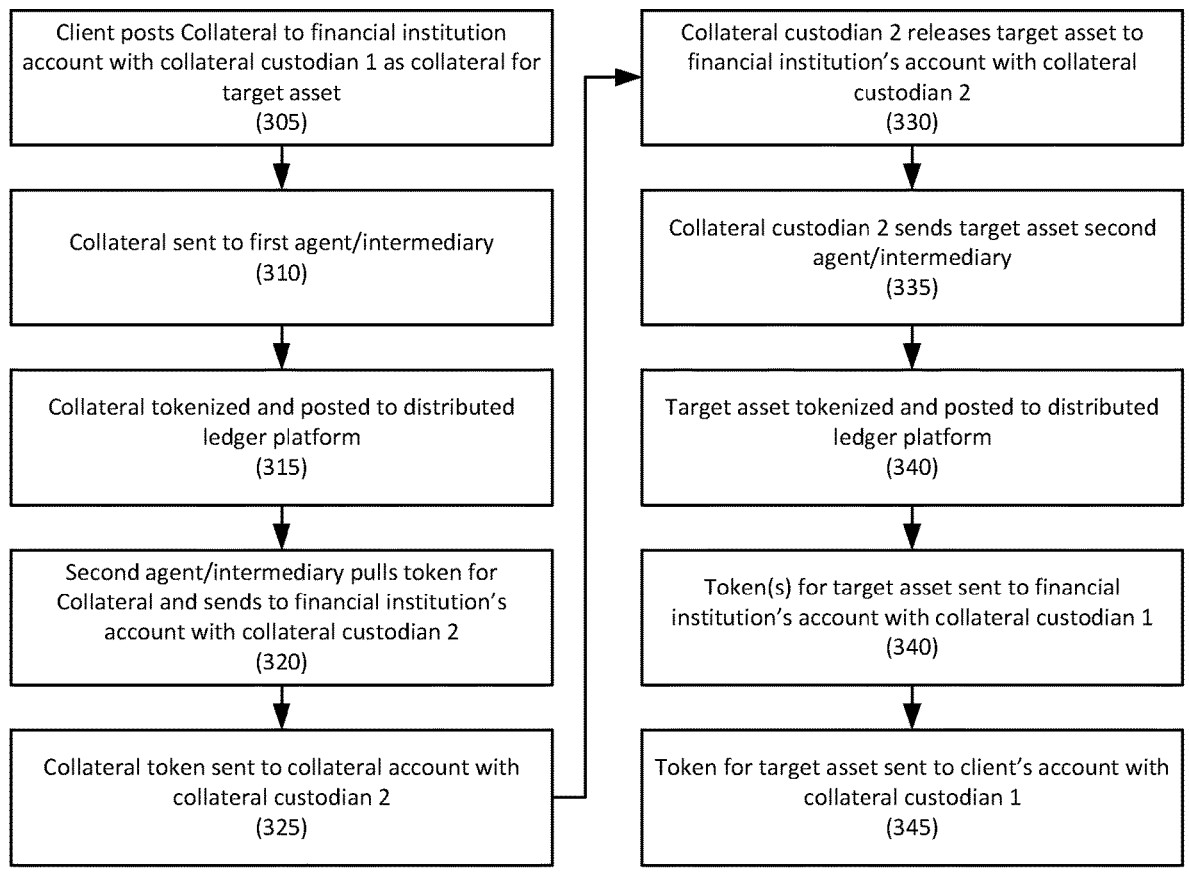
FIG. 3 depicts a method for distributed ledger-based collateral movement according to another embodiment.

Referring to FIG. 3, a method for distributed ledger-based collateral movement is disclosed according to another embodiment. In this embodiment, both CC1 and CC2 accept tokens and consider these tokens equivalent to the underlying assets. Because only tokens are exchanged, frictions and inefficiencies on both legs of the trade are mitigated.

While FIG. 3 depicts a sequential process, it should be noted that certain portions may occur simultaneously. For example, the collateral and the target asset may be tokenized in parallel and the tokens may be held on the distributed ledger platform, in a smart contract. The tokens may be released to their respective parties when both are on the distributed ledger platform, at a certain time upon the occurrence of a triggering event, etc.

In step 305, a client of a financial institution may post collateral, such a Bond A, with collateral custodian 1 for collateral for a target asset, such a Bond B. This may be similar to step 205, above.

In step 310, collateral custodian 1 may send the collateral to a first agent/intermediary. This may be optional, as an agent/intermediary may not be required.

In step 315, the first agent/intermediary may send the collateral to a distributed ledger technology (DLT) platform, such as a blockchain-based platform. The collateral may be tokenized by the DLT platform, if not already tokenized.

In one embodiment, once tokenized, the collateral may be put in escrow or otherwise ringfenced so it cannot be sold, traded, or otherwise disposed of. For example, the first agent/intermediary may keep the collateral, while sending instructions to the distributed ledger platform for tokenization.

In step 320, a second agent/intermediary may pull the token(s) for the collateral from the DLT platform. In one embodiment, the second agent/intermediary may be the same or a different agent or intermediary from the one that sent the collateral to the DLT. It should be noted that, like the first agent/intermediary, the second agent/intermediary may not be required.

In step 325, the agent or intermediary may send the collateral token(s) to the financial institution's account with collateral custodian 2 (CC2). The financial institution may then send the collateral token(s) to, for example, a loan/lending account. The loan/lending account may send the collateral token(s) to a collateral account.

In step 330, collateral custodian 2 may release the target asset.

In step 335, collateral custodian 2 may send the target asset to the second agent/intermediary, which, in step 340, may tokenize the target asset and write the token(s) to the distributed ledger platform.

In one embodiment, once tokenized, the target asset may be put in escrow or otherwise ringfenced so it cannot be sold, traded, or otherwise disposed of. For example, the second agent/intermediary may keep the target asset, while sending instructions to the distributed ledger platform for tokenization.

In step 345, token(s) for the target asset may be sent to the financial institution's account with collateral custodian 1, and in step 345, the token(s) for the target asset may be send client's account with collateral custodian 1.

Figure 4:
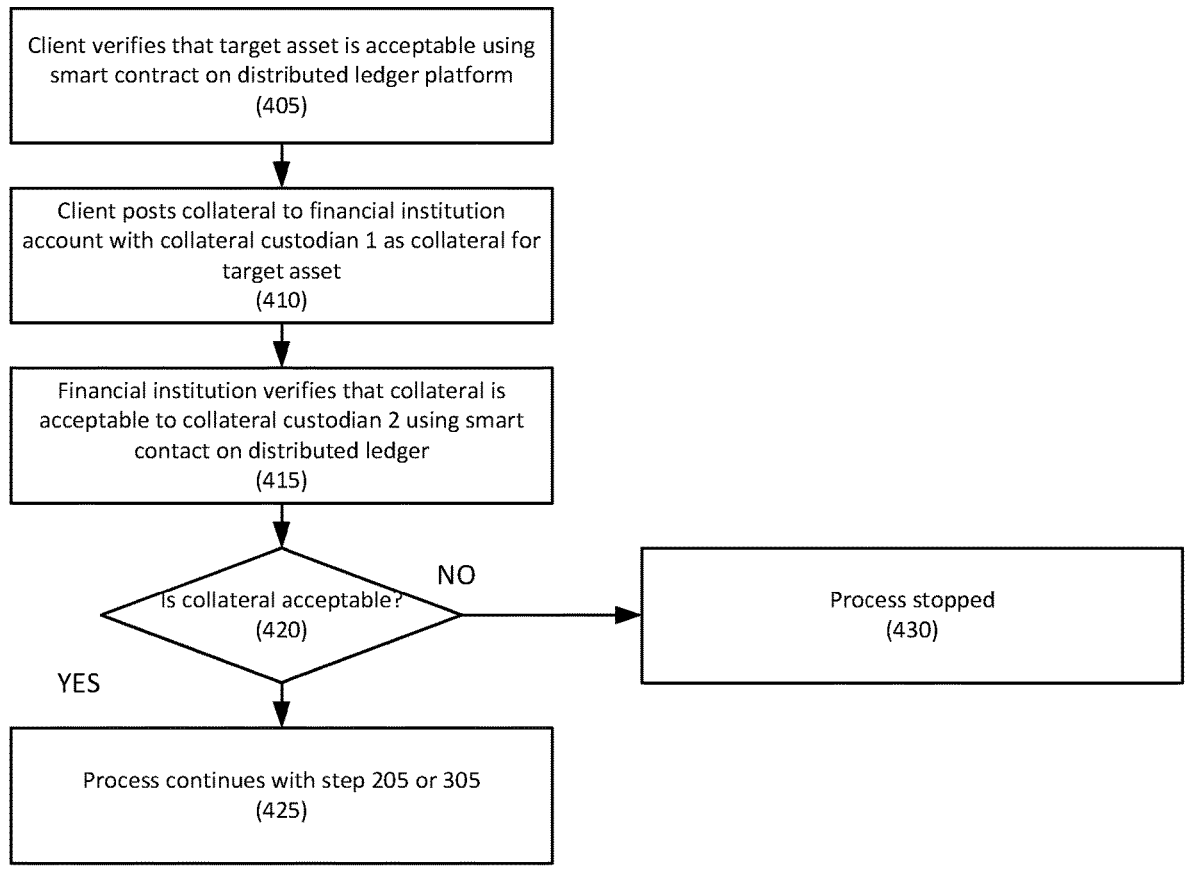
FIG. 4 depicts a method for verifying collateral according to an embodiment.

Referring to FIG. 4, a method for verifying collateral is disclosed according to an embodiment.

In step 405, a client may verify that a counterparty is in possession of a target asset, and that the target asset is acceptable to the client. In one embodiment, the client may access a portal to see the legal entities that have submitted rules on the collateral tokens that they will accept. This may be on the distributed ledger platform or on a separate system.

In one embodiment, both parties may preferably know the other party's rules, and may confirm that the collateral and the asset are acceptable, before tokenizing their respective assets.

In one embodiment, as soon as a matching instruction is received, the criteria for the parties may be located and used to confirm that the collateral and target asset meet the requirements.

In step 410, the client may post an identification of its collateral on the distributed ledger platform to verify that the collateral is acceptable to the counterparty. In one embodiment, the counterparty may post requirements regarding the acceptability of collateral to the distributed ledger platform.

In step 415, a smart contract on the distributed ledger platform may verify that the collateral is acceptable based on the identification of the collateral and the counterparty's requirements. In another embodiment, the smart contact may call a separate system to make this determination.

In step 420, if the collateral is acceptable (e.g., the collateral meets the eligibility criteria for the counterparty), in step 425, the process may continue with steps 205 or 305, or any other suitable step, as is necessary and/or desired.

If the collateral is not acceptable (e.g., it does not meet the eligibility criteria for the counterparty), in step 430, the process may stop.

An illustrative example is as follows. Collateral custodians may tokenize their clients' assets, for example, using agents, and may submit these tokenized assets to a decentralized marketplace, such as an escrow pool. In one embodiment, the escrow pool may include one or more smart contracts. Each client may further submit its collateral requirements to the distributed ledger platform or to an off-chain system.

One or more smart contracts may review the tokenized assets and the collateral requirements and may automatically match two or more parties that have assets that meet each other's collateral requirements. For example, three parties—two on one side and one on the other—may be paired to meet, for example, a quantity requirement. Any suitable number of parties may be matched as is necessary and/or desired.

The trade between the two or more parties may be executed upon a condition agreed to by the parties. In one embodiment, each party may set forth the condition with its submission.

The disclosure of U.S. patent application Ser. No. 16/653,369, U.S. patent application Ser. No. 16/558,415, U.S. patent application Ser. No. 15/869,421, U.S. Provisional Patent Application Ser. No. 62/725,331, and U.S. Provisional Patent Application Ser. No. 62/446,185, U.S. Provisional patent application Ser. No. 16/677,609, filed Nov. 7, 2020, and U.S. Provisional Patent Application Ser. No. 62/757,614, filed Nov. 8, 2018, are hereby incorporated, by reference, in their entireties.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for distributed ledger-based collateral movement, comprising:
    receiving, at a first collateral custodian computer system for a first collateral custodian and from a client of the first collateral custodian, a collateral asset, wherein the collateral asset is collateral for a target asset held by a client of a second collateral custodian;
    posting, to a distributed ledger platform, an identification of the collateral asset;
    retrieving, by the first collateral custodian computer system, a collateral requirement rule of the client of the second collateral custodian;
    writing the collateral requirement rule to the distributed ledger platform;
    verifying, by a smart contract executed by the distributed ledger platform, that the collateral asset is acceptable to the client of the second collateral custodian, wherein the verifying is based on the identification of the collateral asset and the collateral requirement rule of the client of the second collateral custodian;
    tokenizing, by a first agent/intermediary, the collateral asset to a collateral token;
    writing, by the first agent/intermediary, the collateral token to the distributed ledger platform;
    tokenizing, by the second agent/intermediary, the target asset to a target token;
    writing, by the second agent/intermediary and in response to the verifying that the collateral asset is acceptable, the target token to the distributed ledger platform;
    escrowing the collateral asset and the target asset after the collateral asset and the target asset are tokenized;
    receiving, from the distributed ledger platform, the collateral token; and
    releasing the target token to the first collateral custodian in response to receiving the collateral token.

2. The method of claim 1, wherein the collateral asset and the target asset are a same type of asset.

3. The method of claim 1, wherein the collateral asset and/or the target asset are bonds.

4. A system, comprising:
    a first collateral custodian computer system for a first collateral custodian comprising a first collateral custodian computer processor and a first collateral custodian memory;
    a second collateral custodian computer system for a second collateral custodian comprising a second collateral custodian computer processor and a second collateral custodian memory;

a first agent/intermediary computer system comprising a first agent/intermediary computer processor and a first agent/intermediary memory;

a second agent/intermediary computer system comprising a second agent/intermediary computer processor and a second agent/intermediary memory; and a distributed ledger platform;

wherein:

the first collateral custodian computer system is configured to receive, from a client of the first collateral custodian, a collateral asset, wherein the collateral asset is collateral for a target asset held by a client of the second collateral custodian;

the first collateral custodian computer system is configured to post, to a distributed ledger platform, an identification of the collateral asset;

the first collateral custodian computer system is configured to retrieve a collateral requirement rule of the client of the second collateral custodian;

the first collateral custodian computer system is configured to write the collateral requirement rule to the distributed ledger platform;

a smart contract executed by the distributed ledger platform is configured to verify that the collateral asset is acceptable to the client of the second collateral custodian, wherein the verifying is based on the identification of the collateral asset and a collateral requirement rule of the client of the second collateral custodian;

the first agent/intermediary computer system is configured to tokenize the collateral asset to a collateral token;

the first agent/intermediary computer system is configured to write the collateral token to the distributed ledger platform;

the second agent/intermediary computer system is configured to tokenize the target asset to a target token;

the first agent/intermediary computer system is configured to write, in response to the verifying that the collateral asset is acceptable, the target token to the distributed ledger platform;

the first agent/intermediary computer system or the second agent/intermediary computer system is configured to escrow the collateral asset and the target asset after the collateral asset and the target asset are tokenized;

the second collateral custodian computer system is configured to receive, from the distributed ledger platform, the collateral token; and the second collateral custodian computer system is configured to release the target token to the first collateral custodian in response to receiving the collateral token.

5. The system of claim 4, wherein the collateral asset and the target asset are a same type of asset.

6. The system of claim 4, wherein the collateral asset and/or the target asset are bonds.

\* \* \* \* \*